STATIC TURNOFF METHOD AND APPARATUS FOR CROSSED-FIELD SECONDARY-EMISSION COLD-CATHODE REENTRANT-SYSTEM R.F. PULSED AMPLIFIERS

Filed Sept. 19, 1967

2 Sheets-Sheet 1

INVENTOR.
GEORGE K. FARNEY
BY Wm. J. Nolan
ATTORNEY

INVENTOR.
GEORGE K. FARNEY
BY Wm J Nolan
ATTORNEY

United States Patent Office 3,503,001

Patented Mar. 24, 1970

3,503,001

STATIC TURNOFF METHOD AND APPARATUS FOR CROSSED-FIELD SECONDARY-EMISSION COLD-CATHODE REENTRANT-SYSTEM R.F. PULSED AMPLIFIERS

George K. Farney, New Providence, N.J., assignor, by mesne assignments, to Varian Associates, Palo Alto, Calif., a corporation of California Filed Sept. 19, 1967, Ser. No. 668,784
Int. Cl. H03f *1/26*
U.S. Cl. 330—42 12 Claims

ABSTRACT OF THE DISCLOSURE

Cold-cathode, crossed-field, reentrant-stream, R.F. pulsed amplifier tubes are disclosed employing method and apparatus for automatically terminating the R.F. output of the tube upon the termination of the input R.F. pulse to be amplified. Various statically operating means are provided for locally reducing the secondary electron current drawn into the circulating hub of current in the magnetron-type interaction region. The reduction of cathode current is localized and reduced sufficiently such that the presence of a coherent R.F. input pulse on the slow wave circuit is necessary to sustain the hub of electron current such that upon termination of the input pulse the R.F. output automatically terminates. The various turnoff means are statically operated such that an expensive modulator is not necessary to obtain turnoff of the tube. The static turnoff devices rely for their operation upon the fact that the localized secondary emission from the cold cathode is less in the presence of noise signals on the slow wave circuit than it is for the case where a coherent R.F. signal is present on the circuit for amplification. Thus, the localized reduction in the cathode current is insufficient in the presence of a strong R.F. drive signal on the circuit to cause the hub current to go to zero. However, noise signals on the R.F. circuit produce insufficient replenishment of the cathode secondary electron current to overcome the localized reduction and the reentrant hub current goes to zero, thereby causing the R.F. output of the tube to cease upon termination of the R.F. input signal to be amplified.

In one embodiment, a turnoff control electrode is disposed in the surface of the cathode, preferably in a section opposite the upstream one-third of the R.F. circuit. A static D.C. potential is applied to the turnoff control electrode to cause a certain fraction of the hub current to be collected on the electrode, in one case, or to be deflected toward the anode and the electron trajectories perturbed to reduce back bombardment of the cathode emitter and thus replenishment of the hub current in the absence of a strong coherent R.F. signal. In another embodiment, the cathode is recessed in a localized region to cause the reentrant hub current to move away from the R.F. fields of the R.F. circuit, and to produce turbulent electron flow for destroying phase coherence to reduce back bombardment of the cathode emitter and, thus, the emission therefrom in the absence of a coherent R.F. signal on the circuit. In another embodiment, the cathode emitter includes a localized raised portion for pushing the circulating hub current away from the cathode and for producing turbulent electron flow and loss of phase lock with waves on the circuit thereby reducing back bombardment of the cathode and the secondary emission therefrom. In another embodiment, a magnetic shunt is provided in the cathode emitter for reducing the magnetic field adjacent to the cathode in a localized region to reduce the back bombardment of the cathode and thus the secondary emission resulting therefrom. In another embodiment, the cathode surface is serrated in a localized region to locally reduce the effective secondary emission of the cathode emitter by trapping the secondary electrons.

DESCRIPTION OF THE PRIOR ART

Heretofore, crossed-field reentrant-stream cold-cathode R.F. pulsed amplifiers have employed various control electrode structures, typically disposed in the cathode emitter surface, for turning off the tube upon termination of the input R.F. pulse to be amplified. However, in these prior devices, a separate modulator was necessary for pulsing the control electrode upon termination of the input pulse. An example of such a prior art device is described and claimed in U.S. Patent 3,255,422 issued June 7, 1966, and assigned to the same assignee as the present invention. The problem with these prior art pulsed control electrodes is that, for high pulse repetition rates, they require relatively complex and expensive modulators for their operation. Therefore, it is desired to obtain means for automatically terminating operation of the tube upon the termination of the input pulse without the necessity of providing the relatively complex and expensive modulator.

SUMMARY OF THE PRESENT INVENTION

The principal object of the present invention is the provision of an improved crossed-field cold-cathode reentrant-stream R.F. pulsed amplifier tube.

One feature of the present invention is the provision, in a crossed-field cold-cathode reentrant-stream R.F. pulsed amplifier tube, of statically operated means for reducing the secondary electron emission current drawn from the cathode to replenish the hub current in the magnetron interaction region, such reduction in the secondary emission current being of sufficient amplitude such that the presence of the R.F. pulse energy to be amplified on the circuit is necessary to sustain operation of the tube such that upon termination of the R.F. pulse the reentrant hub current goes to zero amplitude, whereby the R.F. output of the tube is automatically terminated upon termination of the R.F. drive pulse.

Another feature of the present invention is the same as the preceding feature wherein the means for reducing the secondary emission from the cathode emitter comprises an electrode in the cathode emitter surface operating at a D.C. static potential which may be either positive or negative relative to the cathode emitter.

Another feature of the present invention is the same as the first feature wherein the means for reducing the cathode secondary emission includes a localized perturbation in the cathode surface such as a recess or a raised portion.

Another feature of the present invention is the same as the first feature wherein the means for reducing the cathode secondary emission includes a magnetic member disposed in the cathode emitter in a localized region for producing a local perturbation in the axial magnetic field.

Another feature of the present invention is the same as the first feature wherein the means for reducing the cathode secondary emission includes a localized serrated portion for producing a localized reduction in the effective secondary emission ratio of the cathode emitter, thus, reducing the secondary electron current drawn from the cathode emitter.

Another feature of the present invention is the same as the first feature wherein a plurality of such secondary emission reducing means are provided at intervals about the cathode emitter.

Other features and advantages of the present invention became apparent upon a perusal of the following specifications taken in connection with the accompanying drawings wherein:

DESCRIPTION OF THE PREFERRED EMBODIMENTS

Figure 1:
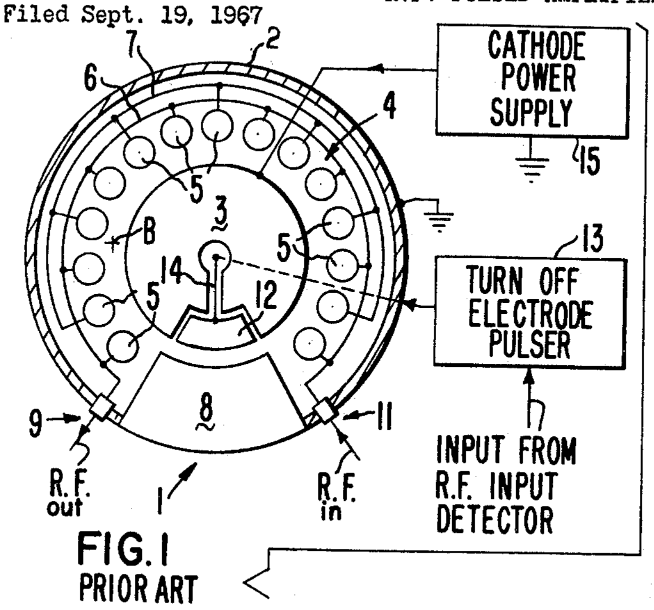
FIG. 1 is a schematic cross-sectional view, partly in block diagram form, of a prior art crossed-field, cold-cathode, reentrant-stream R.F. pulsed amplifier.

Referring now to FIG. 1, there is shown in cross-section a crossed-field, cold-cathode, reentrant-stream R.F. pulsed amplifier of the prior art as more fully described in the aforecited U.S. Patent 3,255,422. More specifically, the tube 1 includes a cylindrical vacuum envelope 2 containing a cylindrical cold-cathode emitter 3 having a secondary emission ratio greater than 1. A forward wave slow wave structure 4 partially surrounds the cathode emitter 3 in concentric relation therewith. In a typical example, the slow wave structure 4 includes an array of bars 5 strapped together by means of a pair of segmented straps 6 and 7 with alternate bars 5 being conductively connected to alternate ones of the straps 6 and 7. A circuit sever 8 is provided for terminating the slow wave circuit 4 to prevent R.F. energy from propagating entirely around the slow wave circuit 4 from the output end 9 back to the input end 11. Any one of a number of forward wave slow wave circuits 4 may be employed. One particularly suitable circuit is a $C_{13}$ strapped bar circuit as described and claimed in U.S. Patent 3,308,336 issued Mar. 7, 1967, and assigned to the same assignee as the present invention.

A control electrode 12 is disposed in the cathode 3 in insulated relation therefrom and supplied with a pulsed D.C. potential from a turnoff electrode pulser 13 via a suitable feedthrough and lead structure 14. The anode structure 4 and envelope 2 are typically operated at ground potential and the cathode is supplied with a negative potential from a cathode power supply 15 via a suitable feedthrough high voltage insulator assembly, not shown.

In operation, a relatively high intensity pulse of R.F. energy is supplied to the input end of the slow wave structure 4 via an input connector at the input end 11 of the circuit. The intense R.F. fields generated on the slow wave circuit produce sufficient back bombardment of the cold cathode emitter 3 to produce copious secondary emission resulting in a circulating hub of secondary electron current in the magnetron type interaction region between the cathode emitter 3 and the anode structure 4. The wave on the slow wave circuit cumulatively interacts with the hub of electrons to produce spokes of electron current which rotate around the cathode to produce a greatly amplified R.F. signal which is extracted from the slow wave circuit 4 at the output terminal end 9 of the circuit 4 and fed to a suitable utilization device.

Figure 2:
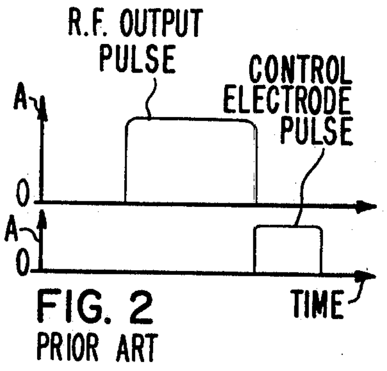
FIG. 2 is a plot of pulse amplitude vs. time showing the prior art method of terminating the R.F. output pulse from the tube of FIG. 1.

At the termination of the input R.F. pulse to be amplified, a detector circuit supplies an input to the turnoff electrode pulser 13 which pulses the control electrode 12 positive with respect to the cathode emitter 3 for collecting the hub of electron current circulating around the cathode and, thus, terminating the R.F. output of the tube, as shown in FIG. 2. Since the control electrode 12 collects substantial current during its operation, the turnoff electrode pulser 13 must be capable of supplying substantial peak power and when operating at high pulse repetition rates is relatively complex and expensive not only due to the high average power but also due to the high capacitance charging currents.

The present method and apparatus for achieving automatic R.F. turnoff of the tube utilizes the difference in the ability of a cold secondary emitting cathode to supply secondary electron current to the hub of circulating current dependent upon whether the kinetic energy of the back bombarding electrons is obtained from interaction with a driven R.F. signal on the slow wave circuit or with a random noise signal in the interaction region.

Figure 3A:
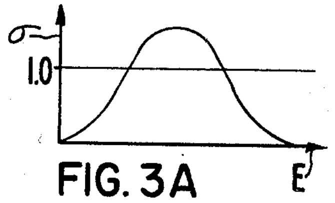
FIG. 3A is a plot of secondary emission ratio $\sigma$ versus energy of incident electrons.
Figure 5:
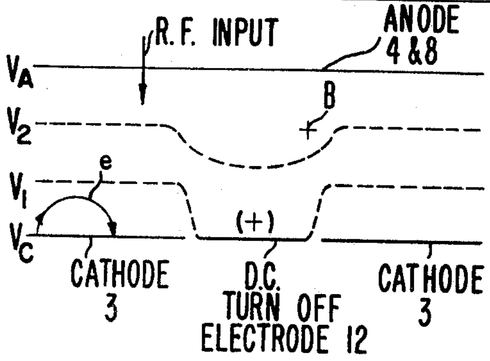
FIG. 5 is a schematic linearized plot of the voltage distribution in the cathode to anode region of the tube of FIG. 3.

Referring now to FIG. 5, in the absence of R.F. energy and the presence of only D.C. electric and magnetic fields in the interaction region, an electron leaving the cathode surface 3 will travel in a cycloidal path and return to the cathode 3 with the same energy it had upon leaving the cathode. In general, this will be too small a value of energy to lead to substantial secondary emission current (see FIG. 3A where secondary emission ratio $\sigma$ is plotted versus energy E of the incident electron). However, the presence of R.F. energy in the interaction region can lead to a transfer of energy from the R.F. wave to the electron, when the phase relation of the signal and the electron position is correct, so that the energy E of the electron upon impact can be much larger than that which it had upon leaving the cathode.

It is this phenomenon that gives the large secondary emission current which is utilized in crossed-field tubes. However, the amount of secondary emission current (and therefore net current) from the localized area of the cathode varies dependent upon whether the electron is interacting with a coherent or noise signal in the interaction region. An electron traveling in the interaction region with the proper phase relation with a synchronous moving R.F. wave on the slow wave circuit will obtain substantial energy as a result of the cumulative interaction. On the other hand, electrons interacting with noise signals do not obtain so much energy because the random phase and magnitude of the signals causes the net cumulative interaction to be not as great. Consequently, the back bombarding energy of the electrons is lower and the secondary emission current is less. This means that the net current from a localized area of the cathode is less. The net current is the difference between the secondary emission current leaving the cathode and the back bombarding current returning to the cathode. That is:

$$I_c = I_{bb}(\sigma - 1)$$

where $I_c$ is the net localized current emission from the cathode, $I_{bb}$ is the back bombarding current, and $\sigma$ is the secondary emission coefficient.

This can be written:

$$I_c = nev(\sigma - 1)$$

where $n$ is the number of electrons back bombarding the cathode, $e$ is the electronic charge, and $v$ is the velocity of the back bombarding electrons.

Since the secondary emission coefficient $\sigma$ is a function of the back bombarding energy, which in crossed-field amplifiers is a function of the type of interaction (noise or driven signal) between the electron and R.F. signal, it is expected that the net local current emission from the cathode can vary dependent upon the type of interaction. Indeed it is observed in pulsed crossed-field amplifiers (that have a good circuit match sufficient to avoid band edge oscillation) that the current drawn to the anode in the R.F. driven stage is greater than the current drawn to the anode in the noisy state of operation that exists when the drive signal is removed.

The present invention utilizes the difference in the secondary emission process between the noise and driven modes of operation so that effectively the tube will operate as a non-reentrant amplifier in the noise mode, thereby achieving self turnoff, but will operate as a reentrant tube in the driven mode leading to normal high efficient operation achieved with these tube types.

Figure 3:
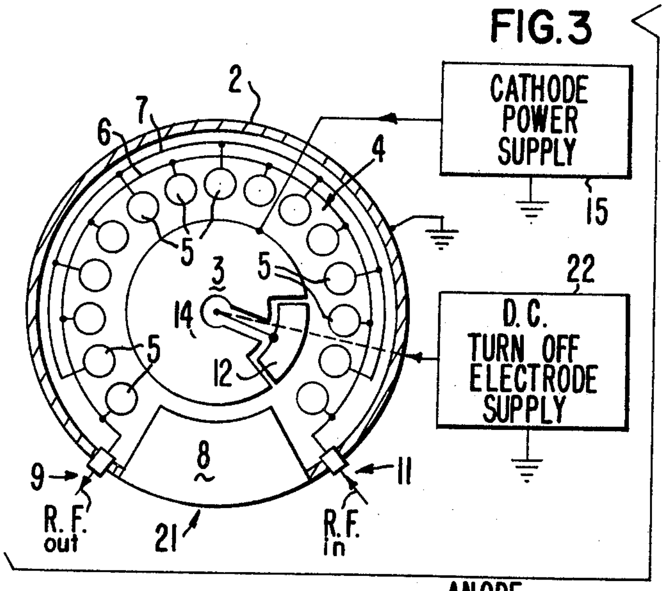
FIG. 3 is a schematic cross-section view, partly in block diagram form, of a crossed-field, cold-cathode, reentrant-stream pulsed R.F. amplifier incorporating features of the present invention.

Referring now to FIG. 3, there is shown a crossed-field, cold-cathode, reentrant-stream R.F. pulsed amplifier tube 21 incorporating features of the present invention. Tube 21 is substantially identical to that of FIG. 1 with the exception that the control electrode 12 has been rotated from a position opposite the circuit sever 8 to a position opposite the upstream input end of the forward wave slow wave structure 4. In a preferred forward wave circuit embodiment, the control electrode structure 12 is disposed within the first one-third of the curved length of the R.F. circuit 4. In addition, a D.C. static turnoff electrode power supply 22 supplies a static D.C. operating potential to the control electrode 12.

Figure 7:
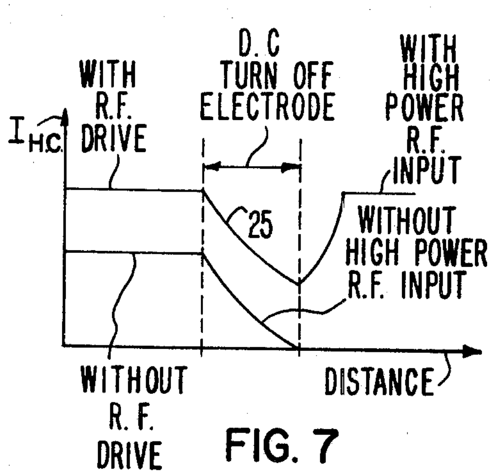
FIG. 7 is a plot of the localized secondary cathode current versus distance along the cathode in the direction of the electron stream and depicting the mode of operation of the tube of FIG. 3, FIGS. 8–11 are plots similar to that of FIG. 5 depicting alternative embodiments of the present invention.

In one mode of operation, a positive static D.C. bias potential is placed on the control electrode 12 relative to the remainder of the cathode 3 to cause the control electrode 12 to collect some of the circulating hub of electron current. By adjusting the D.C. bias potential so that this current collection process is equal to the net current supplied by the electrode 12 during noise mode operation, it will be posible to have the net current from this cathode region be zero for the noise mode of operation. This leads to non-reentrant stream operation and self turnoff. During the driven mode of operation, the net current from this section of the cathode will be greater than zero and some current will continue to be emitted providing electron stream reentrancy and proper amplifier operation. These two modes of operation are more clearly depicted in FIG. 7.

Figure 4:
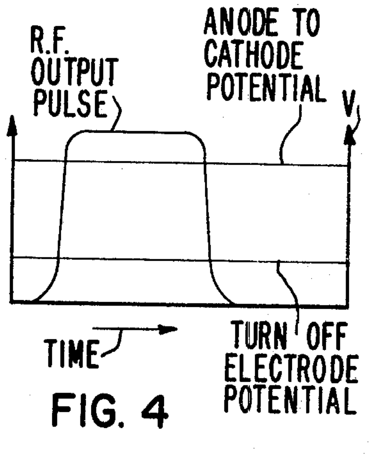
FIG. 4 is a plot of pulse amplitude and voltage versus time depicting the operation of the tube of FIG. 3.

For the case where the control electrode 12 is operated positive with respect to the cathode, it is preferably operated, for example, at $V_1$ which is approximately 30% of the anode voltage, as indicated in FIGS. 4 and 5, to subtract a certain fraction of the hub current from the magnetron interaction region.

In operation, the static operating potentials are applied as indicated in FIGS. 3 and 4 and an input R.F. pulse is applied to the R.F. circuit 4. The R.F. wave on the circuit cumulatively interacts with the electron stream to produce an amplified pulse of output R.F. energy, as indicated in FIG. 4. At the termination of the R.F. input pulse, the R.F. output automatically terminates because the static potential on the turnoff electrode prevents operation of the amplifier in the absence of the R.F. drive signal on the circuit.

Figure 6:
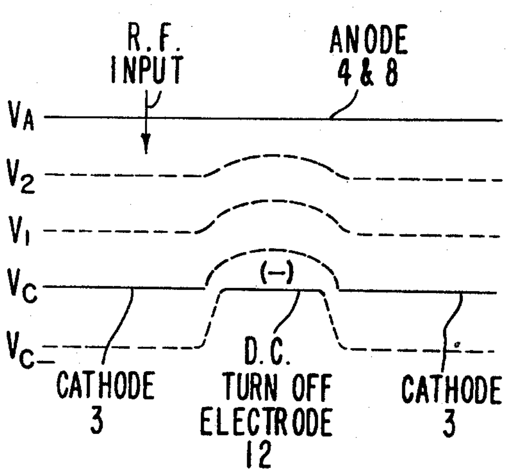
FIG. 6 is a plot similar to that of FIG. 5 showing an alternative embodiment of the present invention.

Referring now to FIG. 6, a different mode of automatic R.F. turnoff of the tube 21 is obtained by placing a negative D.C. static bias potential on turnoff electrode 12 relative to the remaining portion of the cathode 3. In this case, the electrons will be moved further from the control electrode 12 because of the local electric field configuration. The movement of the electrons will be inhibited by the effect of the magnetic field and the electrons will undergo turbulent motion. This will cause noise to be generated, and the electrons will give up energy in this process. A similar effect occurs at the downstream end of the control electrode 12. This means that secondary emission current has been inhibited by the presence of the negative control electrode 12 so that the reentrant stream of secondary electron current is not replenished in the region of the control electrode.

In addition, the electron hub current which moves past the control electrode 12 is located further removed from the cathode 3 so that energy must be transferred to the electrons from an R.F. wave on the circuit to give these electrons sufficient energy to overcome the electric field and reach the cathode for back bombardment. The energy transfer is not as effective from a noise mode as it is from a driven mode, hence further back bombardment and replenishment of the circulating hub current is prevented. The electrons in the interaction region finally move to the anode creating a short burst of noise in the process. On the other hand, in the presence of a driven mode on the circuit, transfer of energy to properly phased electrons is more readily achieved and back bombardment of the cathode occurs producing replenishment of the hub current to produce a reentrant circulating electron stream.

Figure 8:
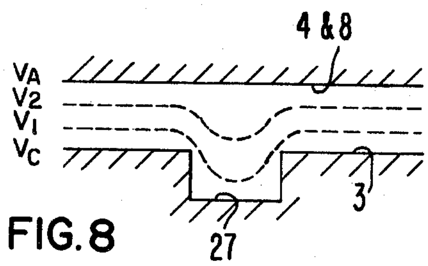

Referring now to FIG. 8, there is shown an alternative static turnoff structure. In this case, a recess 27 is provided in the cathode structure 3 causing equipotential lines to dip toward the recess in the cathode, thereby approximating the equipotential distribution as previously described with regard to FIG. 5. In this case, the hub current is reduced in the region of the recess 27 because the hub current is moved away from the region of the R.F. fields on the anode and turbulent electron flow is produced to reduce replenishment of the hub current lost to the anode and cathode. The depth and circumferential extent of the recess 27 is dimensioned such that the presence of an intense R.F. drive signal on the anode circuit is necessary to sustain a reentrant stream of hub current and R.F. output of the tube.

Figure 9:
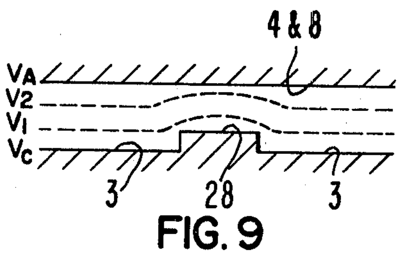

Referring now to FIG. 9, there is shown an alternative turnoff cathode structure. In this embodiment, the cathode 3 is provided with a raised portion 28 to approximate the equipotential distribution and operation as previously described with regard to FIG. 6. The radial and circumferential extent of the raised portion 28 is dimensioned such that the presence of a driven R.F. signal on the anode structure 8 is necessary to sustain R.F. output of the tube.

Figure 10:
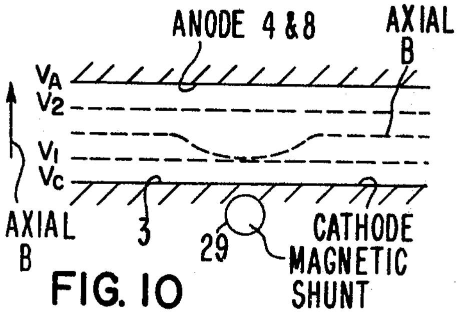

Referring now to FIG. 10, there is shown an alternative embodiment of the present invention. In this embodiment, an axially directed magnetic shunt 29 is provided in the cathode 3 to locally perturb the intensity of the axial magnetic field B in the magnetron interaction region. By perturbing the intensity of the axial magnetic field, and reducing the intensity of the field the cycloidal orbits of the hub electrons increase in height such that they move away from the cathode and enter into a more turbulent flow to reduce the replenishment of electrons to the hub current. The amount of magnetic shunting and the circumferential extent of the shunt are dimensioned such that the presence of a relatively intense driven R.F. signal on the anode circuit 4 is required to sustain R.F. output of the tube and in the absence of the intense R.F. signal the reentrant hub current goes to zero and R.F. output automatically turns off.

Figure 11:
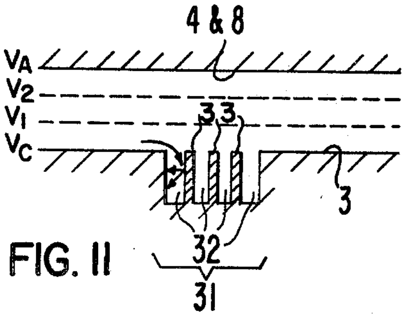

Referring now to FIG. 11, there is shown an alternative embodiment of the present invention. In this embodiment the cathode 3 is serrated at 31 with a plurality of axially directed grooves 32. The grooves preferably have a width of approximately ten times the width of the land portions 33 defined between adjacent grooves 32. The serrated region 31 serves to effectively reduce the secondary emission ratio of the cathode surface since secondary electrons emitted from the sides of the lands 33 are trapped in the grooves 32 and cannot escape into the magnetron interaction region to replenish the hub current. The circumferential extent of the serrated region 31 is dimensioned such that the presence of an intense driven radio frequency signal on the anode 4 is necessary to sustain operation of the tube and in the absence of the R.F. energy on the slow wave circuit the hub current goes to zero, thereby automatically turning off the tube.

In the embodiments of FIGS. 8–11 it should be noted that no D.C. turnoff electrode supply is required; however, the circumferential extent of the turnoff structure may have to be greater than the circumferential extent of the turnoff structure which employs a separate bias potential.

As previously described with regard to FIG. 3, the various turnoff structures are preferably disposed adjacent to the first one-third of the upstream end of the anode slow wave circuit. However, it is not necessary that the turnoff electrode structure be disposed opposite the slow wave structure, and in fact it is possible to dispose the turnoff structure in the region opposite the circuit sever 8.

Figure 12:
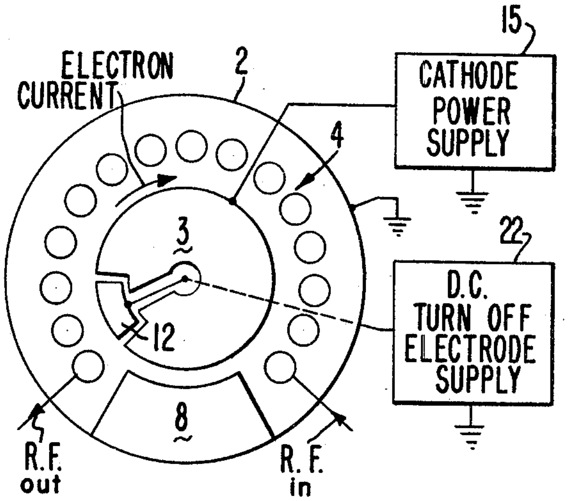
FIG. 12 is a schematic cross-sectional view of a crossed-field, cold-cathode, reentrant-stream, R.F. pulsed amplifier employing a backward wave slow wave circuit and incorporating features of the present invention.

In case a backward wave slow wave structure is employed, as indicated in FIG. 12, the turnoff electrode 12 is preferably disposed adjacent the upstream one-third end of the slow wave circuit 4.

Also, in certain embodiments it may be desirable to provide a plurality of turnoff structures, as previously described, disposed at periodic intervals about the circumference of the cathode 3.

What is claimed is:

1. The method of operating a pulsed secondary-emission reentrant-stream crossed-field amplifier tube comprising the steps of, applying a pulse of radio frequency energy to a severed curved slow wave circuit to produce a reentrant circulating stream of secondary electrons adjacent the slow wave circuit for cumulative magnetron-type interaction with the wave energy on the slow wave circuit to produce amplified output R.F. energy, the improvement comprising, producing a static reduction in the secondary emission current drawn from the cathode into the circulating electron stream, such reduction of current being sufficiently large such that the presence of the applied R.F. energy on the slow wave circuit is necessary to sustain the circulating electron stream and in the absence of the applied R.F. energy the circulating electron stream diminishes to zero amplitude, whereby the R.F. output energy of the tube automatically terminates on termination of the applied pulsed R.F. energy.

2. The method of claim 1, wherein the step of reducing the secondary electron current drawn from the cathode comprises the step of, applying the static D.C. potential to an electrode for producing a localized disturbance in the annular anode to cathode D.C. potential pattern.

3. The method of claim 2, wherein the potential disturbing electrode is located in the surface of the cathode structure and the D.C. potential applied to the electrode is negative with respect to the cathode.

4. The method of claim 2, wherein the potential disturbing electrode is located in the surface of the cathode structure and D.C. potential applied to the electrode is positive with respect to the cathode for locally increasing the electron current collected at the surface of the cathode structure.

5. The method of claim 1, wherein the step of reducing the secondary electron current drawn from the cathode comprises the step of locally reducing the effective secondary emission ratio of the cathode structure.

6. The method of claim 1, wherein the step of reducing the secondary electron current drawn from the cathode comprises the step of locally reducing the intensity of the axial magnetic field in the magnetron interaction gap.

7. In a secondary-emission reentrant-stream crossed-field amplifier tube, means forming concentric anode and cathode structures to define a crossed-field magnetron-type interaction region therebetween, said anode structure including a severed curved slow wave circuit to which pulses of radio frequency energy are applied to produce a reentrant circulating stream of secondary electrons in the magnetron interaction region and to produce cumulative magnetron-type interaction between the R.F. energy on the slow wave circuit and the circulating electron stream for amplifying pulses of radio frequency energy applied to the slow wave circuit, the improvement comprising, means for statically reducing secondary electron current drawn from the cathode which replenishes the circulating electron stream, said secondary electron current being reduced sufficiently such that in the absence of a pulse of input R.F. energy to be amplified the amount of secondary current drawn from the cathode is insufficient to replenish the secondary emission current and the circulating stream of secondary electron current drops to zero amplitude, whereby the R.F. output automatically terminates upon termination of the input pulse of R.F. energy.

8. The apparatus of claim 7, wherein said means for statically reducing the secondary electron current includes an electrode structure disposed in the surface of said cathode, and means for applying a static D.C. potential to said turnoff electrode structure relative to the potential of said cathode.

9. The apparatus of claim 8, wherein said turnoff electrode structure is disposed within the first one-third of the upstream end of said slow wave circuit.

10. The apparatus of claim 7, wherein said means for statically reducing the secondary electron current comprises a localized discontinuity in the surface of the cathode structure.

11. The apparatus of claim 7, wherein said means for statically reducing the secondary electron current comprises a serrated region of the cathode structure for reducing the effective secondary emission ratio of the cathode surface.

12. The apparatus of claim 7, wherein said means for statically reducing the secondary electron current drawn from the cathode comprises a magnetic shunt for locally reducing the intensity of the axially directed magnetic field in the magnetron interaction region.

References Cited

UNITED STATES PATENTS 3,255,422 6/1966 Feinstein et al. ______ 330—42

RODNEY D. BENNETT, Jr., Primary Examiner

D. C. KAUFMAN, Assistant Examiner

U.S. Cl. X.R.

315—3.5, 5.11, 39.63